Patented Dec. 26, 1922.

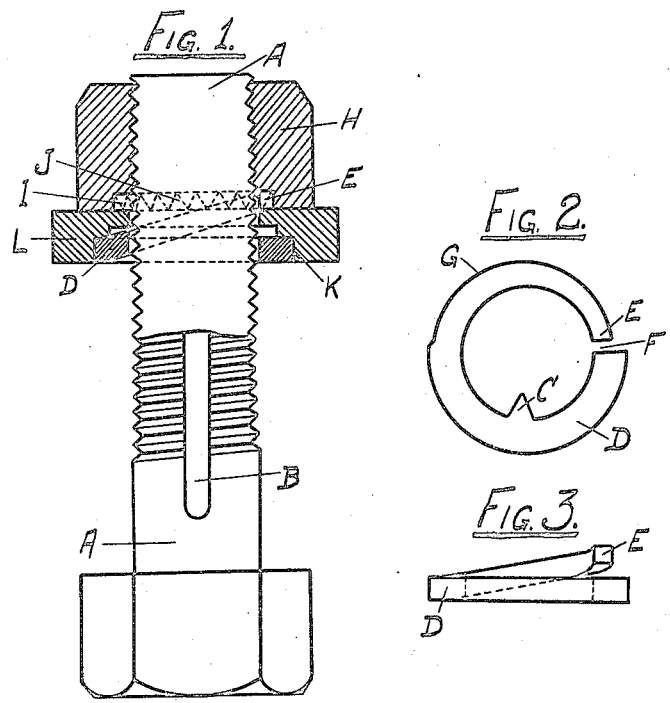
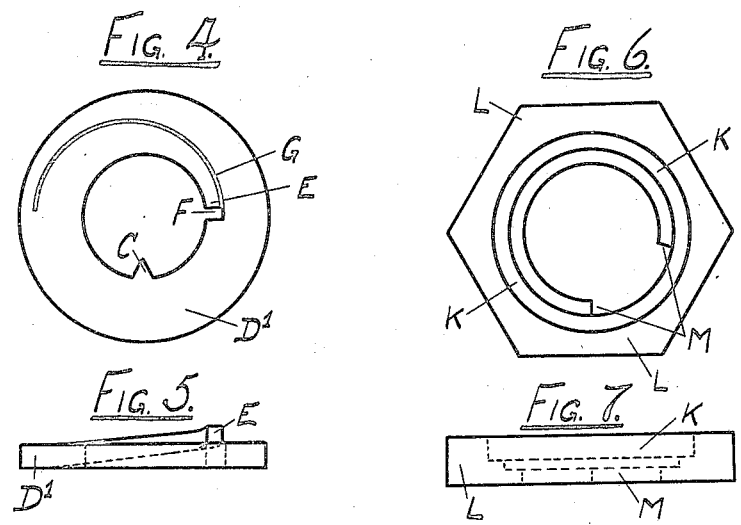

1,440,324

UNITED STATES PATENT OFFICE.

CHARLES WHITAKER, OF STANNINGLEY, ENGLAND.

DEVICE FOR LOCKING NUTS ON BOLTS.

Application filed July 15, 1921. Serial No. 484,973.

*To all whom it may concern:*

Be it known that I, CHARLES WHITAKER, a subject of the King of Great Britain and Ireland, residing at Stanningley, in the county of York, England, have invented a new and useful Improved Device for Locking Nuts on Bolts, of which the following is a specification.

This invention relates to devices for locking nuts on bolts of the kind wherein the bolt is formed with a longitudinal groove into which an inwardly projecting tooth on a split spring washer is adapted to engage, the washer being provided with a pawl-like element or raised tooth on one face for co-operating with notches or inclined ratchet teeth on the underside of the nut.

According to my said invention the raised tooth on the face of the washer is formed by cutting the washer partially radially from the inner periphery and partially eccentrically intermediate the interior and outer peripheries, and the inclined ratchet teeth on the underside of the nut are disposed within an annular recess afforded by enlarging the lower portion of the bore of the nut. For enabling the nut to be unlocked an auxiliary washer of hexagonal or other form may be fitted beneath the nut, this auxiliary washer having on its underside an annular recess adapted to enclose the spring washer and having on one side of the central opening a segmental slot through which the raised tooth of the washer passes for locking engagement with the teeth beneath the nut.

In order that the invention may be clearly understood and readily carried into effect the same will now be more fully described with reference to the accompanying drawing in which:—

Figure 1 is a part sectional elevation of a nut locked to a bolt according to the invention.

Figures 2 and 3 are plan and elevation respectively of the spring washer as used in conjunction with the auxiliary washer, Figures 6 and 7.

Figures 4 and 5 are plan and elevation respectively of the spring washer as used without auxiliary washer.

Figures 6 and 7 are similar views to Figures 2 and 3 respectively of the auxiliary washer.

A is the bolt formed with a locking groove B to receive the tooth C projecting from the inner periphery of the spring washer D. The spring washer is also formed with a tooth or spur E projecting from the face of the washer by cutting the washer radially at F and eccentrically at G the free end of said cut portion being slightly turned to produce the tooth or spur E. The nut H is recessed on its underside at I and provided with ratchet teeth J to co-operate with the tooth or spur E of the washer D. As shown in Figure 1 the washer may lie within the recess K formed in the auxiliary washer L which is cut with a segmental slot at M to allow the tooth or spur E to engage the ratchet teeth J when the parts are in position.

If desired the spring washer $D^1$ may be used with the nut H instead of the spring washer D and auxiliary washer L.

The action of the device is as follows:—
The inner peripheral tooth C of the washer D by engagement with the groove B in the bolt A prevents the washer D from rotating. The ratchet and pawl action between the nut H and washer D, permits of the nut being readily tightened up, whilst preventing any tendency of the nut H to be moved backwards.

To unlock the nut H, the auxiliary washer L is rotated over the spring washer D, and as the nut H prevents the auxiliary washer L from lifting the rotating action depresses the raised tooth E of the spring washer D into position beneath the auxiliary washer L and out of engagement with the teeth J on the nut H, thereby permitting the nut H to be readily slackened and removed in the ordinary manner.

I claim:

A device for positively locking nuts on bolts comprising in combination a bolt having a longitudinal groove therein, a nut having ratchet teeth adjacent the threaded bore slightly below the under surface of the nut, a spring washer having a locking tongue for engaging said ratchet teeth formed by cutting the washer partially radially from its inner periphery and eccentrically for half of its circumference between the inner and outer peripheries, a projection on the inner periphery of the washer disposed directly opposite the central portion of the locking tongue for engagement with the groove in the bolt and a hexagonal unlocking washer for enclosing the locking washer having two concentric recesses of varying depths, the inner and deeper recess being cut away to permit the extremity of the locking tongue to pass therethrough to engage the ratchet teeth on the nut in the locking position, whilst the outer shallow recess receives the more rigid portion of the washer opposite the locking tongue.

CHARLES WHITAKER.